unUS009679700B2

(12) United States Patent
Nishiyama

(10) Patent No.: US 9,679,700 B2
(45) Date of Patent: Jun. 13, 2017

(54) CAPACITOR MODULE AND POWER CONVERSION DEVICE

(71) Applicant: Murata Manufacturing Co., Ltd., Nagaokakyo-shi, Kyoto-fu (JP)

(72) Inventor: Shigeki Nishiyama, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/073,839

(22) Filed: Mar. 18, 2016

(65) Prior Publication Data

US 2016/0203915 A1 Jul. 14, 2016

Related U.S. Application Data

(63) Continuation of application No. PCT/JP2014/074034, filed on Sep. 11, 2014.

(30) Foreign Application Priority Data

Sep. 20, 2013 (JP) .................................. 2013-195104

(51) Int. Cl.
*H01G 4/30* (2006.01)
*H01G 4/232* (2006.01)
(Continued)

(52) U.S. Cl.
CPC ............. *H01G 4/232* (2013.01); *H01G 4/005* (2013.01); *H01G 4/228* (2013.01); *H01G 4/30* (2013.01); *H02M 7/537* (2013.01); *H02M 7/003* (2013.01)

(58) Field of Classification Search
CPC ........ H02M 7/003; H02M 7/42; H02M 7/537; H02M 2007/42; H01G 4/005; H01G 4/228; H01G 4/30
See application file for complete search history.

(56) References Cited

U.S. PATENT DOCUMENTS 5,323,520 A * 6/1994 Peters .................... H01G 4/232
29/25.42
5,400,210 A * 3/1995 Sugimoto ................ H01G 4/08
361/305
(Continued)

FOREIGN PATENT DOCUMENTS

JP H04-056207 A 2/1992
JP 2000069766 A 3/2000
(Continued)

OTHER PUBLICATIONS

International Search Report for PCT/JP2014/074034 date of mailing Dec. 9, 2014.
(Continued)

*Primary Examiner* — Matthew Nguyen
(74) *Attorney, Agent, or Firm* — Arent Fox LLP

(57) ABSTRACT

Provided is a capacitor module (10) for connection to a plurality of power conversion circuits, which includes: a dielectric part (11) that has a plurality of flat-film dielectric layers (18A, 18B) laminated; a capacitance formation part (12) that has conductors opposed to each other with the dielectric layers (18A, 18B) interposed therebetween within the dielectric part (11); and multiple pairs of output terminals (13A, 13B, 13C) that are connected respectively to the multiple power conversion circuits, where the multiple pairs of output terminals (13A, 13B, 13C) are connected to each other with the capacitance formation part (12) interposed therebetween.

12 Claims, 5 Drawing Sheets

(51) Int. Cl.
*H01G 4/005* (2006.01)
*H01G 4/228* (2006.01)
*H02M 7/537* (2006.01)
*H02M 7/00* (2006.01)

(56) References Cited

U.S. PATENT DOCUMENTS

| | | | | |
|---|---|---|---|---|
| 6,794,729 | B2 * | 9/2004 | Mori | H01L 23/49822 257/295 |
| 7,046,501 | B2 * | 5/2006 | Tsuji | H01G 4/232 257/E23.062 |
| 7,742,303 | B2 * | 6/2010 | Azuma | B60L 3/12 361/699 |
| 2001/0055194 | A1 | 12/2001 | Moriwaki et al. | |
| 2011/0188279 | A1 | 8/2011 | Aiba et al. | |

FOREIGN PATENT DOCUMENTS

| | | |
|---|---|---|
| JP | 2006294789 A | 10/2000 |
| JP | 2001351829 A | 12/2001 |
| JP | 2007151331 A | 6/2007 |
| JP | 2011160519 A | 8/2011 |
| JP | 2012-151939 A | 8/2012 |
| JP | 2013051882 A | 3/2013 |
| WO | WO 2013069485 A1 | 5/2013 |
| WO | WO 2013086546 A1 | 6/2013 |

OTHER PUBLICATIONS

Written Opinion for PCT/JP2014/074034 date of mailing Dec. 9, 2014.

* cited by examiner

CAPACITOR MODULE AND POWER CONVERSION DEVICE

CROSS REFERENCE

The present application is a continuation of International application No. PCT/JP2014/074034, filed Sep. 11, 2014, which claims priority to Japanese Patent Application No. JP2013-195104, filed Sep. 20, 2013, the entire contents of each of which are incorporated herein by reference.

TECHNICAL FIELD

The present invention relates to a capacitor module with a plurality of capacitor elements electrically connected, and a power conversion device using the module.

BACKGROUND ART

Power conversion devices such as three-phase inverters and two-phase inverters that convert a direct-current input to multiple alternating-current outputs are provided with smoothing capacitor elements that smooth direct-current inputs (see for example, Japanese Patent Application Laid-Open No. 2006-294789).

In the power conversion devices, the suppression of the equivalent series inductance (ESL) of the smoothing capacitor elements and of the inductance of connection paths of the smoothing capacitor elements is desired in order to suppress the switching surge generated in converting direct-current inputs to alternating-current outputs. Therefore, in the power conversion device described in Japanese Patent Application Laid-Open No. 2006-294789, a capacitor module is configured to have a plurality of film capacitors electrically connected in parallel via a positive electrode bus bar and a negative electrode bus bar. Further, each respective film capacitor of the capacitor module is brought in close to a switching circuit that outputs an alternating-current output for each phase, and the positive electrode bus bar and the negative electrode bus bar are opposed with an insulating member interposed therebetween. Thus, the inductance of a connection path between the film capacitor and the switching circuit is suppressed to suppress the ESL of the capacitor module as a whole.

SUMMARY OF THE INVENTION

In the power conversion device and the capacitor module described in Japanese Patent Application Laid-Open No. 2006-294789, the positive electrode bus bar and the negative electrode bus bar have a complex structure, which causes the power conversion device and the capacitor module to be increased in size, and the manufacturing cost to be kept high. Moreover, even when the positive electrode bus bar and the negative electrode bus bar are able to suppress the inductance of the part of the bars opposed with the insulating member interposed therebetween, the bars are not able to suppress the inductance of the part opposed to the film capacitors, thereby resulting in a limited effect of suppressing the ESL of the capacitor module as a whole.

Therefore, an object of the present invention is to provide a capacitor module for use in a power conversion device, which easily achieves the reduction in module size and the reduction in manufacturing cost, and can achieve more suppression of ESL as a whole than ever before, and a power conversion device using the module.

The present invention provides a capacitor module for connection to a plurality of power conversion circuits that convert a direct-current input to multiple alternating-current outputs, the capacitor module including:

a dielectric block having alternating dielectric flat film and conductive layers such that each adjacent pair of dielectric flat film layers is sandwiched by a respective pair of the conductive layers; and multiple pairs of terminals, each pair of terminals including a first terminal connected to a first conductive layer of each respective pair of conductive layers and a second terminal connected to a second conductive layer of each respective pair of conductive layers, whereby each of the pairs of terminals can be connected to a respective power conversion circuit.

In this configuration, there is no need for a bus bar or similar structure between the multiple pairs of output terminals. Therefore, the size of the module and the manufacturing cost can be reduced. In addition, the loss caused by a bus bar and the inductance of the bus bar can be eliminated, thereby making it possible to lower the loss and inductance of a connection path between the capacitor module and the power conversion circuits.

The pair of terminals preferably includes a plurality of terminals provided on the same surface at the outer surface of the dielectric part. Thus, the direction of a ripple current that flows between one of the pair of terminals and the dielectric block defining a capacitance formation part is opposite to the direction of a ripple current that flows between the other of the pair of terminals and the capacitance formation part. Then, magnetic fields generated near connection parts between the pairs of terminals and the electrodes cancel each other out to suppress the ESL of the capacitor module itself. In addition, the spacing between first and second terminals of each respective pair of terminals is less than the spacing between adjacent pairs of terminals, all as viewed along a main plane of the dielectric block. This can further suppress the ESL of the capacitor module.

The capacitor module preferably further includes a pair of terminals that connect a direct-current input to the conductive layers. This causes the direct-current input to flow directly to the conductive layers and the noise content superimposed on the direct-current input can be thus absorbed efficiently.

The dielectric layers preferably include a resin film. This makes it possible to configure a capacitor module as a film capacitor, thereby making it easy to increase the capacitance of the capacitor module.

The resin film preferably has a thermosetting resin as a main material. This makes it possible to configure a capacitor module that is higher in heat resistance than in the case of adopting a thermoplastic resin. It is to be noted that there is a possibility that the omission of a bus bar will increase the heat generated within the dielectric part or decrease the heat release performance from the dielectric part, thereby making the dielectric part more likely to generate heat, and it is thus remarkably effective to make the capacitor module highly heat-resistant, from the perspective of reliability and the like of the capacitor module.

A power conversion device according to the present invention includes:

a plurality of power conversion circuits, each power conversion circuit converting a direct-current input applied thereto to an alternating-current output, n being an integer greater than 1; and a capacitor module comprising:
a dielectric block having alternating dielectric flat film and conductive layers such that each adjacent pair of dielectric flat film layers is sandwiched by a respective pair of the conductive layers; and
n pairs of output terminals, each pair of output terminals including a first terminal connected to a first conductive layer of each respective pair of conductive layers and a second terminal connected to a second conductive layer of each respective pair of conductive layers, the first and second terminals of each of the pairs of output terminals being connected to a respective one of the power conversion circuits.

Thus, the capacitor module configured to be small in size and low in cost with a bus bar omitted can be used as a smoothing capacitor element to configure a power conversion device that is small in size and low in cost. In addition, the use of the capacitor module with low ESL as a smoothing capacitor element makes it possible to effectively absorb the switching surge caused in the power conversion circuits. For this reason, the power conversion circuits can be configured with the use of a switching element or the like that is low in withstand voltage, thereby making it possible to further reduce the size of the power conversion device, lower the cost thereof, and lower the loss thereof. In addition, the improved switching speed can advance lowering of loss, thereby improving the output density of the power conversion device.

MODE FOR CARRYING OUT THE INVENTION

First, a capacitor module according to a first embodiment of the present invention will be described.

Figures 1A, 1B, 1C:
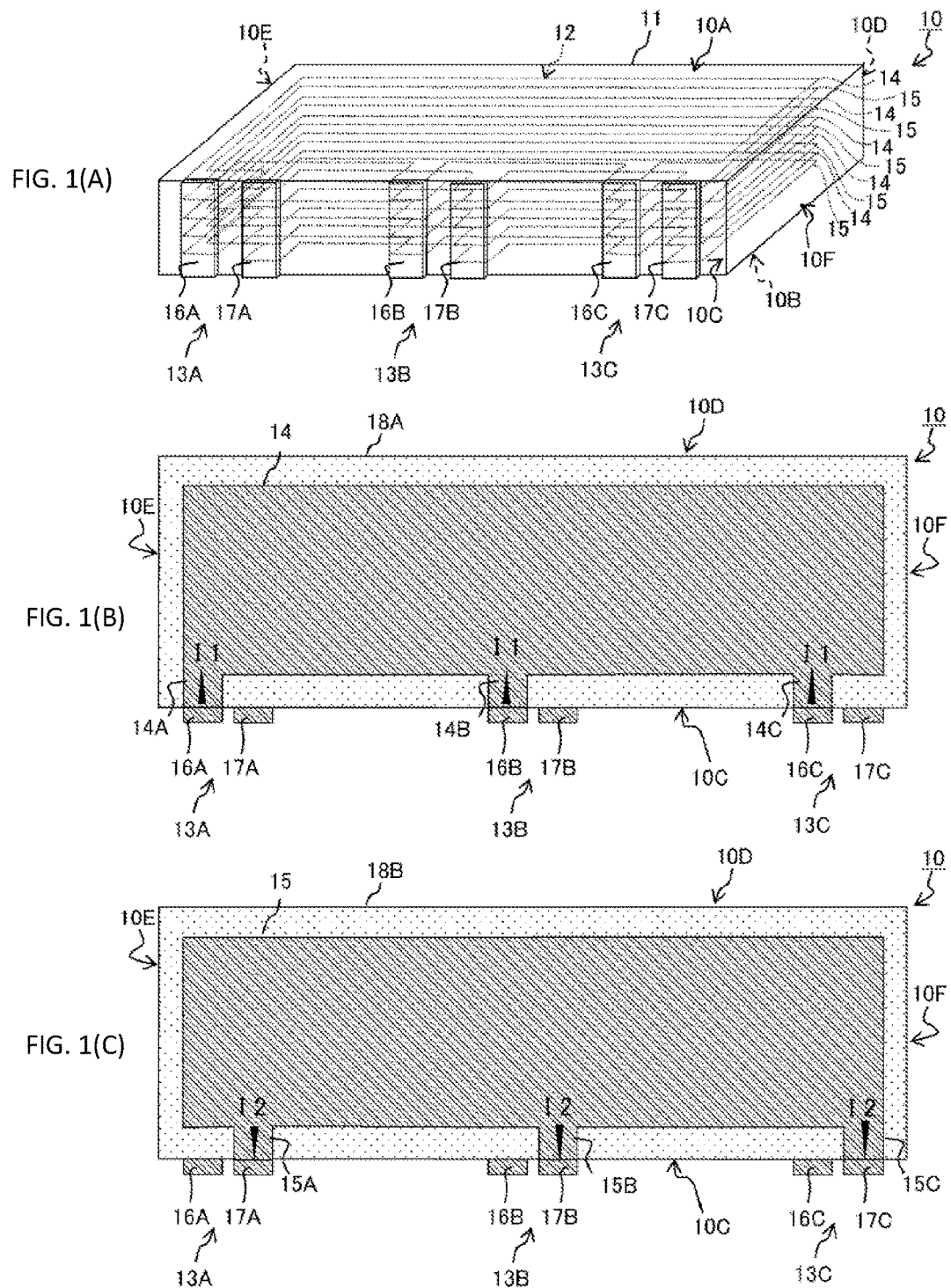
FIG. 1(A) shows a perspective view of a capacitor module according to a first embodiment of the present invention.
FIGS. 1(B) and 1(C) show plane sectional views of the capacitor module of FIG. 1(A).

FIG. 1(A) is a perspective view of a capacitor module according to the first embodiment of the present invention. FIGS. 1(B) and 1(C) are plane sectional views of the capacitor module according to the first embodiment of the present invention.

A capacitor module 10 according to the present embodiment includes a dielectric part 11, a capacitance formation part 12, and pairs of output terminals 13A, 13B, 13C. A pair of input terminals (not shown) are also provided. The pairs of output terminals 13A, 13B, 13C are multiple pairs of terminals for connecting the capacitance formation part 12 to a power conversion circuit as described later.

The dielectric part 11 preferably has a substantially cuboid shape, and has a top surface 10A, a bottom surface 10B, a front surface 10C, a back surface 10D, a left surface 10E, and a right surface 10F. The dielectric part 11 has a plurality of dielectric layers 18A, 18B, two of which are shown in FIGS. 1(B) and 1(C). The dielectric layers are alternately laminated in a direction perpendicular to the top surface 10A and bottom surface 10B of the dielectric part 11. Each of the dielectric layers 18A, 18B has the shape of a flat film extending in a plane parallel to the top and bottom surfaces 10A and 10B of the dielectric part 11. The dielectric layers 18A, 18B are preferably composed of resin films configured to have a thermosetting resin such as, for example, polyvinyl acetal as a main material, and joined to each other by thermally curing the thermosetting resin.

The pair of output terminals 13A includes a first terminal conductor 16A and a second terminal conductor 17A provided at the same surface of the dielectric part 11, the front surface 10C herein, and each extend along the front surface 10C from the top surface 10A to the bottom surface 10B. Further, the terminal conductor 16A and the terminal conductor 17A are close to one another and are disposed closer to the left surface 10E at the front surface 10C of the dielectric part 11.

The pair of output terminals 13B includes a first terminal conductor 16B and a second terminal conductor 17B. The terminal conductors 16B, 17B both provided at the same surface of the dielectric part 11, the front surface 10C herein, each extend from the top surface 10A to the bottom surface 10B at the front surface 10C. Further, the terminal conductor 16B and the terminal conductor 17B are close to each other are disposed closer to the center between the left surface 10E and the right surface 10F at the front surface 10C of the dielectric part 11.

The pair of output terminals 13C includes a first terminal conductor 16C and a second terminal conductor 17C. The terminal conductors 16C, 17C both provided at the same surface of the dielectric part 11, the front surface 10C herein, each extend from the top surface 10A to the bottom surface 10B at the front surface 10C. The terminal conductor 16C and the terminal conductor 17C are close to each other are disposed closer to the right surface 10F at the front surface 10C of the dielectric part 11.

The capacitance formation part 12 includes a plurality of first internal conductor parts 14 and a plurality of second internal conductor part 15. The internal conductor parts 14 are provided to extend along the surfaces of the dielectric layers 18A within the dielectric part 11. The internal conductor parts 15 are provided to extend along the surfaces of the dielectric layers 18B within the dielectric part 11. The internal conductor parts 14, 15 are alternately disposed and opposed to each other with the dielectric layers 18A, 18B interposed therebetween in a direction perpendicular to the top surface 10A and the bottom surface 10B.

More specifically, as shown in FIGS. 1(B) and 1(C), the first internal conductor part 14 is formed in a substantially rectangular shape that covers most of the dielectric layer 18A excluding a peripheral edge thereof in planar view, and is provided with extended conductor parts 14A, 14B, 14C at an edge part closer to the front surface 10C of the dielectric layer 18A. The second internal conductor part 15 is formed in a substantially rectangular shape that covers most of the dielectric layer 18B excluding a peripheral edge thereof in planar view, and is provided with extended conductor parts 15A, 15B, 15C at an edge part closer to the front surface 10C of the dielectric layer 18B.

The extended conductor parts 14A and the extended conductor parts 15A are close to each other and are disposed closer to the left surface 10E of the dielectric part 11. The extended conductor parts 14A extending to the front surface 10C of the dielectric layers 18A are connected to the first terminal conductor 16A of the pair of output terminals 13A. The extended conductor parts 15A extending to the front surface 10C of the dielectric layers 18B are connected to the second terminal conductor 17A of the pair of output terminals 13A.

The extended conductor parts 14B and the extended conductor parts 15B are close to each other and are disposed closer to the center between the left surface 10E and the right surface 10F of the dielectric part 11. The extended conductor parts 14B extending to the front surface 10C of the dielectric layers 18A are connected to the first terminal conductor 16B of the pair of output terminals 13B. The extended conductor parts 15B extending to the front surface 10C of the dielectric layers 18B are connected to the second terminal conductor 17B of the pair of output terminals 13B.

The extended conductor parts 14C and the extraction conductor parts 15C are close to each other are disposed closer to the right surface 10F of the dielectric part 11. The extended conductor parts 14C extending to the front surface 10C of the dielectric layers 18A are connected to the first terminal conductor 16C of the pair of output terminals 13C. The extended conductor parts 15C extending to the front surface 10C of the dielectric layers 18B are connected to the second terminal conductor 17C of the pair of output terminals 13C.

Therefore, the first terminal conductors 16A, 16B, 16C are each electrically connected to the plurality of first internal conductor parts 14. In addition, the second terminal conductors 17A, 17B, 17C are each electrically connected to the plurality of second internal conductor parts 15. Thus, the multiple pairs of output terminals 13A, 13B, 13C are connected to each other with the capacitor formation part 12 interposed therebetween.

Each of the first and second internal conductors 14 and 15 are formed on respective resin films which serve as dielectric layers 18A and 18B such that each dielectric layer is interposed between a respective pair of opposing conductors 14, 15. This is achieved by alternately stacking and joining the resin films to serve as the dielectric layers 18A and the resin films to serve as the dielectric layers 18B with a dielectric layer 18A or a dielectric layer 18B located therebetween.

It is to be noted that in order to enhance the adhesion between the resin films and the adhesion between the internal conductor parts 14, 15 and the resin films, it is preferable to form the internal conductor parts 14, 15 onto uncured or semi-cured resin films and stack the resin films on one another, and then thermally harden the stacked body of the resin films. The thus enhanced adhesion in the stacked body of the resin films can enhance the reliability of the capacitor module 10.

Figure 2A:
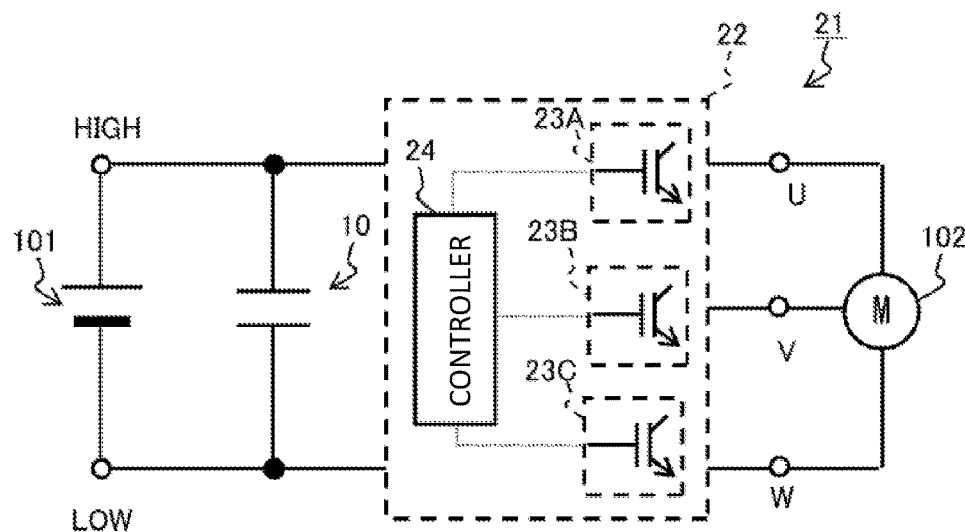
FIG. 2(A) shows a schematic diagram of a power conversion device according to the first embodiment of the present invention.

FIG. 2(A) is an equivalent circuit schematic of a power conversion device 21 according to the first embodiment of the present invention.

The power conversion device 21 is a so-called three-phase inverter herein, which outputs a three-phase alternating-current output with a phase difference of 120° to a motor 102 in response to the input of a direct-current input from a power source 101. Therefore, the power conversion device 21 has direct-current input terminals HIGH, LOW and alternating current connection terminals U, V, W, and includes a capacitor module 10 and an intelligent power module (IPM) 22. The capacitor module 10 is connected as a shunt between the direct-current input terminals HIGH, LOW (connected to respective input terminals of the capacitor module 10), and used as a smoothing capacitor element for smoothing the direct-current input received from the power source 101. The IPM 22 includes three power conversion circuits 23A, 23B, 23C with switching elements such as an insulating gate bipolar transistor (IGBT), and a controller 24 that controls the switching of the respective power conversion circuits 23A, 23B, 23C. The respective power conversion circuits 23A, 23B, 23C respectively connected to the alternating-current connection terminals U, V, W, output a three-phase alternating-current output to the three-phase alternating-current motor 102.

Figure 2B:
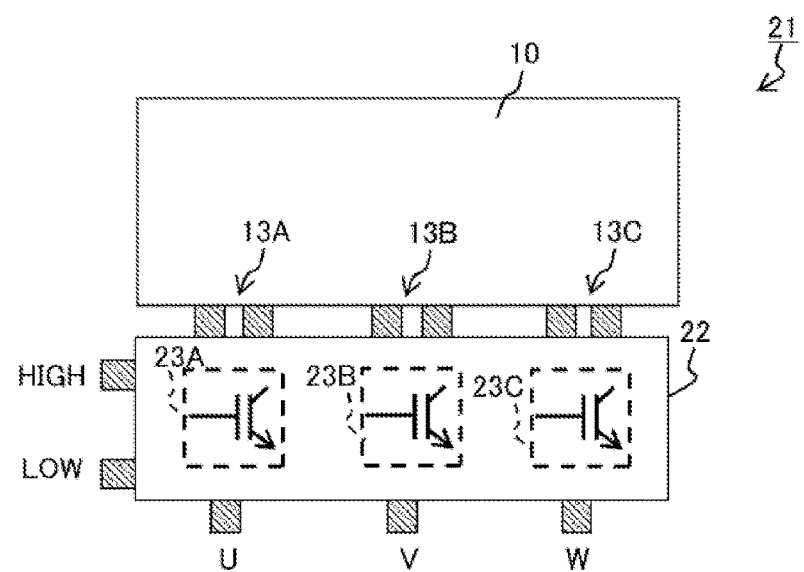
FIG. 2(B) shows an equivalent circuit schematic of the power conversion device of FIG. 2(A).

FIG. 2(B) is a schematic diagram of the power conversion device 21 according to the first embodiment of the present invention.

The pairs of output terminals 13A, 13B, 13C of the capacitor module 10 are respectively connected directly to the respective power conversion circuits 23A, 23B, 23C of the IPM 22. More specifically, either one of the first terminal conductors 16A, 16B, 16C or the second terminal conductors 17A, 17B, 17C are connected to a connection path to a direct-current input terminal HIGH of the IPM 22, whereas the other of the first terminal conductors 16A, 16B, 16C or the second terminal conductors 17A, 17B, 17C are connected to a connection path to a direct-current input terminal LOW of the IPM 22. Thus, with the respective power conversion circuits 23A, 23B, 23C of the IPM 22, the pairs of output terminals 13A, 13B, 13C are connected to the respective power conversion circuits 23A, 23B, 23C. Therefore, even when a conventional composition is omitted such as a bus bar, the respective power conversion circuits 23A, 23B, 23C of the IPM 22 can be each individually connected to the smoothing capacitor element (capacitor module 10). Therefore, the reduction in module size and the reduction in manufacturing cost can be improved by the eliminated need for a bus bar. In addition, the loss caused by a bus bar and the inductance of the bus bar can be eliminated, thereby lowering the loss and inductance of the connection path between the capacitor module 10 and the IMP 22.

In addition, the capacitor module 10 has not only the low inductance on the connection path between the capacitor module 10 and the IMP 22, but also characteristics of lower ESL of the capacitor module 10 itself. This is because when a ripple current flows to the capacitor module 10 from the IPM 22, a ripple current I1 flowing through the extended conductor parts 14A, 14B, 14C has an opposite direction to a ripple current I2 flowing through the extended conductor parts 15A, 15B, 15C as shown by arrowheads in FIGS. 1(B) and 1(C), thereby resulting in a magnetic field produced by the ripple current I1 and a magnetic field produced by the ripple current I2 acting to cancel each other out, and reducing the ESL of the capacitor module 10 itself.

It is to be noted that the ESL of the capacitor module 10 is lower because the location where the ripple current I1 flows (that is, the locations where the extended conductor parts 14A, 14B, 14C are provided) are closer to the location where the ripple current I2 flows (that is, the locations where the extended conductor parts 15A, 15B, 15C are provided). Therefore, in this capacitor module 10, the respective pairs of output terminals 13A, 13B, 13C have terminal conductors arranged closely to each other, and the capacitor module 10 thus has extremely low ESL as a whole. Therefore, the switching surge caused in the power conversion device 21 can be efficiently absorbed.

In addition, while it is difficult to dispose a pair of terminal conductors on the same end surface or bring the conductors close to each other in the case of a conventional wound capacitor module, it is easy to dispose a pair of terminal conductors on the same end surface or bring the conductors close to each other in the case of a laminated capacitor module as shown in the present embodiment.

In addition, since this capacitor module 10 is configured to generally have a cuboid shape and not a cylindrical shape like a wound film capacitor, almost no excess gap is produced. Therefore, even when the size is small, high capacitance can be achieved, and the power conversion device 21 can be configured to be small in size and high in output density.

In addition, this capacitor module 10 easily achieves higher capacitance characteristics than those of ceramic capacitors because the dielectric part 11 is composed of the resin films. In addition, the dielectric part 11 achieves higher heat-resistance characteristics than in the case of adopting a thermoplastic resin such as, for example, PET, PPE, or PBT because of a thermosetting resin such as, for example, polyvinyl acetal used as a main material. For this reason, even when the omission of a bus bar increases the heat generated within the dielectric part 11 or decreases the heat release performance from the dielectric part, thereby making the dielectric part more likely to generate heat, high reliability can be ensured because the capacitor module 10 has higher heat-resistance characteristics.

The present invention can be achieved by the capacitor module according to the first embodiment as described above. It is to be noted that while the capacitor module is configured to be a film capacitor composed of resin films in the present embodiment, the capacitor module is not limited to a film capacitor, but may be a ceramic capacitor. Even in this case, the practice of the present invention can be achieved in a preferred manner.

Next, a capacitor module according to a second embodiment of the present invention will be described.

Figure 3A:
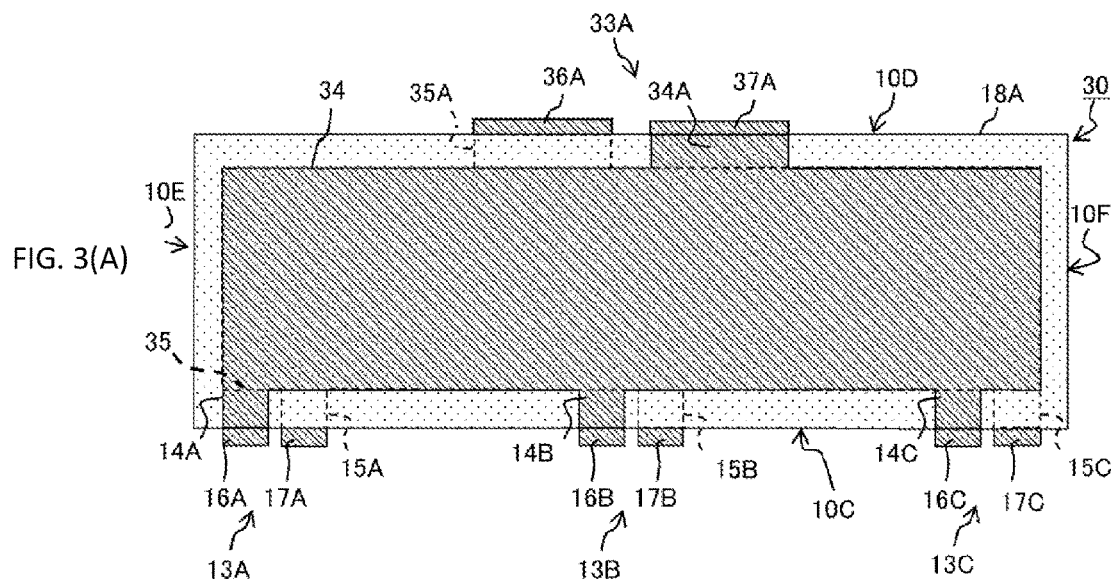
FIG. 3(A) shows a plane sectional view of a capacitor module according to a second embodiment of the present invention.

FIG. 3(A) is a plane sectional view of a capacitor module according to the second embodiment of the present invention. A capacitor module 30 according to the present embodiment has almost the same configuration as the first embodiment, but partially differs in internal conductor shape, and moreover, includes pairs of input terminals 33A. The pairs of input terminals 33A are pairs of terminals for connecting a direct-current input to a capacitance formation part.

The pairs of input terminals 33A include a first terminal conductor 36A and a second terminal conductor 37A. The terminal conductors 36A, 37A are located close to each other and at the same surface of a dielectric part, a back surface 10D of the dielectric part herein.

An internal conductor 34 is provided with an extended conductor part 34A at an edge part close to the back surface 10D. Likewise, an internal conductor 35 is provided with an extended conductor part 35A at an edge part closer to the back surface 10D. The extended conductor part 34A and the extended conductor part 35A are located close to each other and extend to the back surface 10D of the dielectric layer. The extended conductor part 34A is connected to the first terminal conductor 36A of the pair of input terminals 33A and the extended conductor part 35A is connected to the second terminal conductor 37A of the pair of input terminals 33A.

In this way, the first terminal conductor 36A of the pairs of input terminals 33A is electrically connected to a plurality of first internal conductors 34. In addition, the second terminal conductor 37A of the pairs of input terminals 33A is electrically connected to a plurality of second internal conductors 35. Thus, the pairs of input terminals 33A are connected to multiple pairs of output terminals 13A, 13B, 13C with a capacitance formation part interposed therebetween.

Figure 3B:
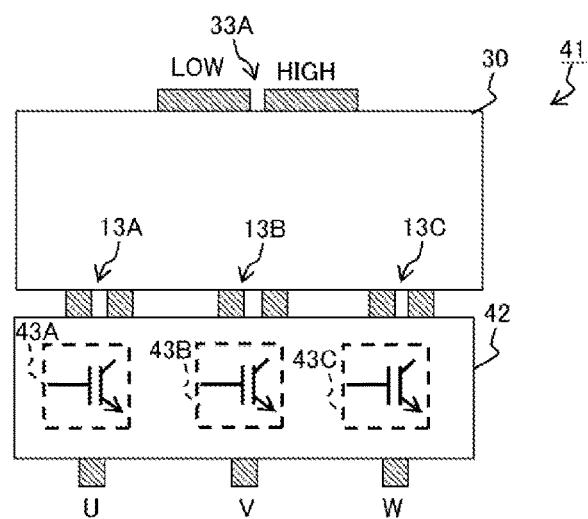
FIG. 3(B) shows a schematic diagram of the power conversion module according to the third embodiment.

FIG. 3(B) is a schematic diagram of a power conversion device 41 according to the second embodiment of the present invention.

The power conversion device 41 is a three-phase inverter as in the first embodiment, which has direct-current input terminals HIGH, LOW and alternating current connection terminals U, V, W, and includes a capacitor module 30 and an intelligent power module (IPM) 42.

The capacitor module 30 with the pairs of input terminals 33A connected to the direct-current input terminals HIGH, LOW of the power conversion device 41, is used as a smoothing capacitor element for smoothing direct-current inputs that is input from direct-current input terminals HIGH, LOW. The IPM 42 includes power conversion circuits 43A, 43B, 43C. The power conversion circuits 43A, 43B, 43C are respectively connected to alternating-current connection terminals U, V, W. The pairs of output terminals 13A, 13B, 13C of the capacitor module 30 are respectively connected directly to the respective power conversion circuits 43A, 43B, 43C of the IPM 42.

Even in the thus configured power conversion device 41, the respective power conversion circuits 43A, 43B, 43C of the IPM 42 can be each individually connected to the smoothing capacitor element (capacitor module 30), while a conventional structure such as a bus bar is omitted.

Moreover, in this configuration, a direct-current input is input to the internal conductors 34, 35 of the capacitor module 30 from the pairs of input terminals 33A to cause the direct-current input to flow directly through the internal conductors 34, 35 (capacitance formation part), thus making it possible to efficiently absorb the noise content superimposed on the direct-current input.

Specifically, in this configuration, the direction of a direct current from the direct-current input terminal HIGH through the internal conductor 34 to the pairs of output terminals 13A, 13B, 13C is opposite to the direction of a direct current from the pairs of output terminals 13A, 13B, 13C through the internal conductor 35 to the direct-current input terminal LOW. For this reason, at the pairs of input terminals 33A and the pairs of output terminals 13A, 13B, 13C, the ESL for direct-current inputs is also suppressed, and the noise content superimposed on the direct-current inputs will be thus absorbed efficiently.

Next, a capacitor module according to a third embodiment of the present invention will be described.

Figure 4:
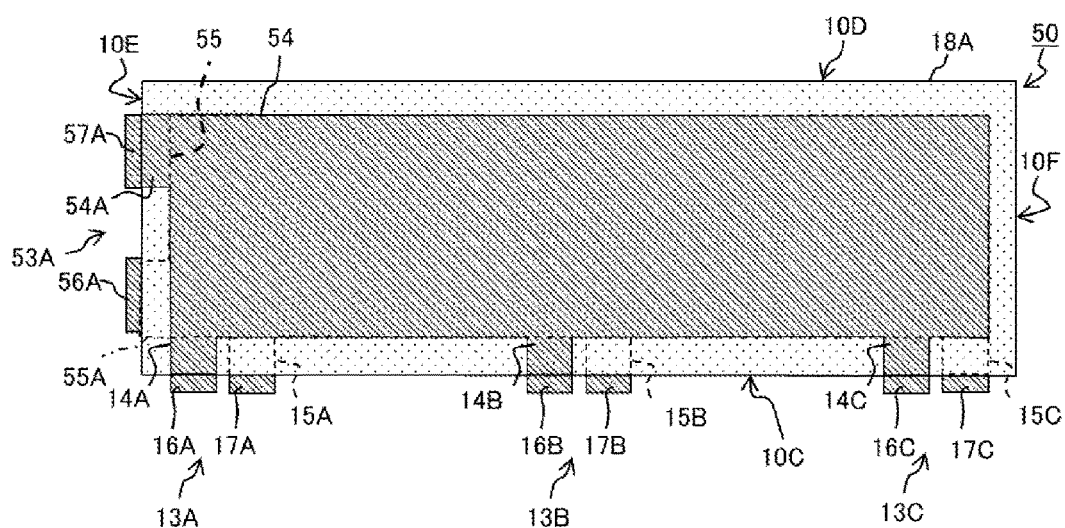
FIG. 4 shows a plane sectional view of a capacitor module according to a third embodiment of the present invention.

FIG. 4 is a plane sectional view of a capacitor module 50 according to the third embodiment of the present invention. The capacitor module 50 according to the present embodiment has almost the same configuration as the second embodiment, but differs in location of a pair of input terminals 53A. Specifically, the pair of input terminals 53A is provided at a surface (left surface 10E) of a dielectric part, which is perpendicular to a surface (front surface 10C) of the dielectric part with pairs of output terminals 13A, 13B, 13C provided. As just described, the pair of input terminals 53A can be provided at any surface.

Next, a capacitor module according to a fourth embodiment of the present invention will be described.

Figure 5A:
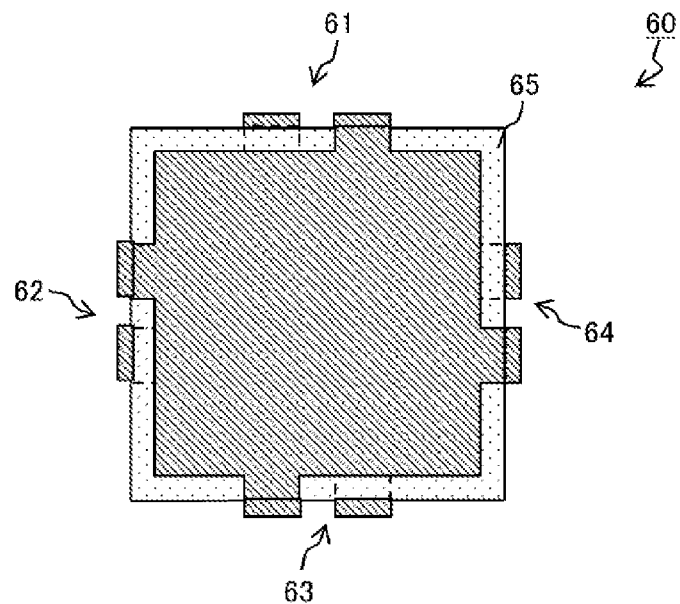
FIG. 5(A) shows a plane sectional view of a capacitor module of a power conversion device according to a fourth embodiment of the present invention.
Figure 5B:
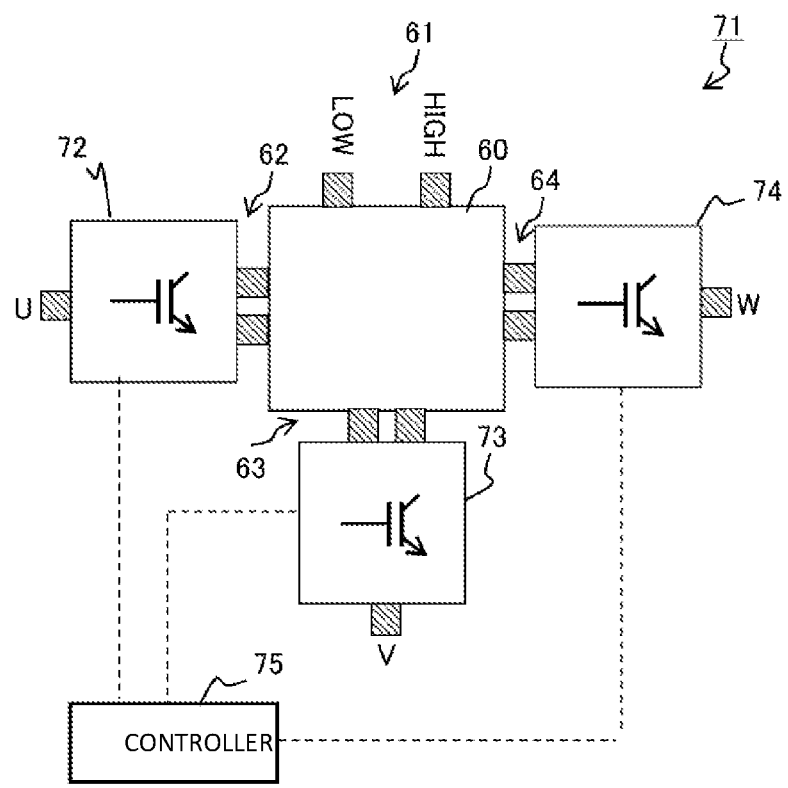
FIG. 5(B) shows a schematic diagram of the power conversion device according to the fourth embodiment.

FIG. 5(A) is a plane sectional view of a capacitor module 60 according to the fourth embodiment of the present invention. FIG. 5(B) is a schematic diagram of a power conversion device 70 according to the fourth embodiment of the present invention.

The capacitor module 60 according to the present embodiment includes a pair of input terminals 61, pairs of output terminals 62, 63, 64, and a dielectric part 65. The pair of input terminals 61 and the pairs of output terminals 62, 63, 64 are provided respectively at different side surfaces of the dielectric part 65. As just described, the pairs of output terminals 62, 63, 64 can be also at any surface of the dielectric part 65. However, in this case, respective power conversion circuits that are connected to the pairs of output terminals 62, 63, 64 are preferably configured as individual modules, and connected respectively in close to the pairs of output terminals 62, 63, 64.

The power conversion device 71 shown in FIG. 5(B) includes a capacitor module 60, switching circuit modules 72, 73, 74, and a controller module 75. The power conversion circuit modules 72, 73, 74, which each have a switching element such as an insulating gate bipolar transistor (IGBT), are respectively connected to the pairs of output terminals 62, 63, 64 of the capacitor module 60, and are respectively connected to alternating-current connection terminals U, V, W to output a three-phase alternating-current output. The controller module 75 controls the switching of the power conversion modules 72, 73, 74.

While examples of configuring a three-phase inverter as a power conversion device have been given in the above descriptions of the respective embodiments, the power conversion device may have other configurations. For example, a two-phase inverter may be configured as a power conversion device, or a power conversion device that outputs more than three phases may be configured. In addition, the specific configuration of the capacitor module is also not to be considered limited to the embodiments described above, and the module may be configured so that, for example, the dielectric part is covered with a case or a mold material, thereby improving the environment resistance of the capacitor module. In addition, in order to increase the number of internal conductors laminated, the capacitor module may be configured in such a way as to stack a plurality of sub-modules on one another.

The invention claimed is:

1. A capacitor module for connection to a plurality of power conversion circuits that convert a direct-current input to multiple alternating-current outputs, the capacitor module comprising:
    a dielectric block having alternating dielectric flat film and conductive layers such that each adjacent pair of dielectric flat film layers is sandwiched by a respective pair of the conductive layers; and
    multiple pairs of terminals, each pair of terminals including a first terminal connected to a first conductive layer of each respective pair of conductive layers and a second terminal connected to a second conductive layer of each respective pair of conductive layers, whereby each of the pairs of terminals can be connected to a respective power conversion circuit.

2. The capacitor module according to claim 1, wherein, for each pair of terminals, the first and second terminals are located on a same surface of the dielectric block.

3. The capacitor module according to claim 2, wherein each of the dielectric flat film layers extend parallel to a plane and the spacing between the first and second terminals of each respective pair is less than the spacing between adjacent pairs of terminals as measured along the plane.

4. The capacitor module according to claim 1, further including a pair of input terminals connected to respective ones of the conductive layers such that a direct-current can be input to the conductive layers.

5. The capacitor module according to claim 1, wherein each of the dielectric layers comprises a resin film.

6. The capacitor module according to claim 5 wherein the resin film has a thermosetting resin as a main component.

7. A power conversion device comprising:
    n power conversion circuits, each power conversion circuit converting a direct-current input applied thereto to an alternating-current output, n being an integer greater than 1; and
    a capacitor module comprising:
        a dielectric block having alternating dielectric flat film and conductive layers such that each adjacent pair of dielectric flat film layers is sandwiched by a respective pair of the conductive layers; and
        n pairs of output terminals, each pair of output terminals including a first terminal connected to a first conductive layer of each respective pair of conductive layers and a second terminal connected to a second conductive layer of each respective pair of conductive layers, the first and second terminals of each of the pairs of output terminals being connected to a respective one of the power conversion circuits.

8. The power conversion device according to claim 7, wherein, for each pair of terminals, the first and second terminals are located on a same surface of the dielectric block.

9. The power conversion device according to claim 8, wherein each of the dielectric flat film layers extend parallel to a plane and the spacing between the first and second terminals of each respective pair is less than the spacing between adjacent pairs of terminals as measured along the plane.

10. The power conversion device according to claim 7, further including a pair of input terminals connected to respective ones of the conductive layers such that a direct-current can be input to the conductive layers.

11. The power conversion device according to claim 7, wherein each of the dielectric layers comprises a resin film.

12. The power conversion device according to claim 11 wherein the resin film has a thermosetting resin as a main component.

* * * * *